United States Patent [19]

Nishino et al.

[11] Patent Number: 5,126,852
[45] Date of Patent: Jun. 30, 1992

[54] COMPRESSED VIDEO SIGNAL RECORDING/VARIABLE-SPEED REPRODUCTION APPARATUS

[75] Inventors: Masakazu Nishino, Kashiwa; Chojuro Yamamitsu; Akifumi Ide, both of Kawanishi; Akira Iketani, Higashiosaka; Tatsuro Juri, Osaka, all of Japan

[73] Assignee: Matsushita Electric Industrial Co., Ltd., Osaka, Japan

[21] Appl. No.: 686,483

[22] Filed: Apr. 17, 1991

[30] Foreign Application Priority Data

Apr. 27, 1990 [JP] Japan ................... 2-113305

[51] Int. Cl.⁵ .................................... H04N 5/783
[52] U.S. Cl. .................... 358/335; 358/312; 360/101
[58] Field of Search ............ 358/335, 312; 360/72.3, 360/73.1, 73.2, 73.3, 73.5, 73.8, 10.1, 33.1

[56] References Cited

U.S. PATENT DOCUMENTS

4,791,499 12/1986 Mester ................... 358/335
4,910,605 3/1990 Sasaki et al. ........... 358/312

Primary Examiner—Robert L. Richardson
Assistant Examiner—Huy Nguyen
Attorney, Agent, or Firm—Stevens, Davis, Miller & Mosher

[57] ABSTRACT

A video signal recording/reproducing apparatus which records pictures by compressing the video signal in multiple field units and reproduces an signal by the expansion process, and which continuously and repeatedly outputs each field of the reproduced television signal on the screen by use of a field detecting unit which operates to ensure that a reciprocal of a multiplication index of a desired reproducing speed is selected as a number of continuous reproductions of one field and also by use of a change-over unit for changing over the reproduced signal in field units.

2 Claims, 7 Drawing Sheets

FIG. 2

| | | | | | | | | | | | | | | | | | | |
|---|---|---|---|---|---|---|---|---|---|---|---|---|---|---|---|---|---|---|
| A | 0 | 1 | 0 | 1 | 0 | 1 | 2 | 3 | 2 | 3 | 2 | 3 | 4 | 5 | 4 | 5 | 4 | 5 |
| F | b | c | b | c | b | c | b | c | b | c | b | c | b | c | b | c | b | c |
| B | 0 | | 0 | | 0 | | 2 | | 2 | | 2 | | 4 | | 4 | | 4 | |
| C | 0 | 1 | 0 | 1 | 0 | 1 | 2 | 3 | 2 | 3 | 2 | 3 | | 5 | | 5 | | 5 |
| X | 0 | 1 | 0 | 0 | 0 | 2 | 2 | 2 | 2 | 3 | 2 | 4 | 4 | 4 | 4 | 4 | 4 | 4 |
| Y | 1 | 1 | 1 | 1 | 1 | 1 | 3 | 3 | 3 | 3 | 3 | 3 | 5 | 5 | 5 | 5 | 5 | 5 |
| S | x | x | x | y | y | y | x | x | x | y | y | y | x | x | x | y | y | y |
| Z | 0 | 0 | 1 | 1 | 1 | 2 | 2 | 3 | 3 | 3 | 4 | 4 | 4 | 5 | 5 | 5 | 5 | 5 |

1 frame = 1 processig-unit 3 fields reproducing time →

1 frame = 1 processing-unit → reproducing time

| | | | | | | | | | | | | | | | | | | | |
|---|---|---|---|---|---|---|---|---|---|---|---|---|---|---|---|---|---|---|---|
| A | 0 | 1 | 0 | 1 | 0 | 1 | 2 | 3 | 2 | 3 | 2 | 3 | 4 | 5 | 4 | 5 | 4 | 5 |
| F | d | d | d | d | d | d | d | d | d | d | d | d | d | d | d | d | d | d |
| D |   | 0 | 0 | 0 | 0 | 0 | 2 | 2 | 2 | 2 | 2 | 4 | 4 | 4 | 4 |   |   |   |
| Z | 0 | 0 | 0 | 0 | 0 | 0 | 2 | 2 | 2 | 2 | 2 | 2 | 4 | 4 | 4 | 4 | 4 |   |

FIG. 6

1 frame = 1 processing-unit → reproducing time

| | | | | | | | | | | | | | | | | | | | |
|---|---|---|---|---|---|---|---|---|---|---|---|---|---|---|---|---|---|---|---|
| A | 4 | 5 | 4 | 5 | 4 | 5 | 2 | 3 | 2 | 3 | 2 | 3 | 0 | 1 | 0 | 1 | 0 | 1 |
| F | d | d | d | d | d | d | d | d | d | d | d | d | d | d | d | d | d | d |
| D | 4 | 4 | 4 | 4 | 4 | 4 | 2 | 2 | 2 | 2 | 2 | 2 | 0 | 0 | 0 | 0 | 0 |   |
| Z | 4 | 4 | 4 | 4 | 4 | 4 | 2 | 2 | 2 | 2 | 2 | 2 | 0 | 0 | 0 | 0 | 0 | 0 |

FIG. 7

1 frame = 1 processig-unit → reproducing time

| A | 0 | 1 | 4 | 5 | 8 | 9 | 12 | 13 | 16 | 17 | 20 | 21 | 24 | 25 | 28 | 29 | 32 | 33 |
|---|---|---|---|---|---|---|----|----|----|----|----|----|----|----|----|----|----|----|
| F | d | | d | | d | | d | | d | | d | | d | | d | | d | |
| D | 0 | | 4 | | 8 | | 12 | | 16 | | 20 | | 24 | | 28 | | 32 | |
| Z | 0 | 0 | 4 | 4 | 8 | 8 | 12 | 12 | 16 | 16 | 20 | 20 | 24 | 24 | 28 | 28 | 32 | 32 |

FIG. 8

1 frame = 1 processig-unit → reproducing time

| A | 32 | 33 | 28 | 29 | 24 | 25 | 20 | 21 | 16 | 17 | 12 | 13 | 8 | 9 | 4 | 5 | 0 | 1 |
|---|----|----|----|----|----|----|----|----|----|----|----|----|---|---|---|---|---|---|
| F | d | | d | | d | | d | | d | | d | | d | | d | | d | |
| D | 32 | | 28 | | 24 | | 20 | | 16 | | 12 | | 8 | | 4 | | 0 | |
| Z | 32 | 32 | 28 | 28 | 24 | 24 | 20 | 20 | 16 | 16 | 12 | 12 | 8 | 8 | 4 | 4 | 0 | 0 |

FIG. 9

COMPRESSED VIDEO SIGNAL RECORDING/VARIABLE-SPEED REPRODUCTION APPARATUS

BACKGROUND OF THE INVENTION

1. Field of the Invention

This invention relates to a video signal recording/reproducing apparatus for recording television signals in a recording media by compressing multiple fields of the television signal as a unit which is hereinafter referred to as multiple field unit, and reproducing the recorded television signals in normal play mode, high-speed search mode or slow play mode.

2. Description of the Prior Art

To form video recording/reproducing apparatuses (e.g. VTRs, video disc players) for recording and reproducing video signals, the bit rate reduction technology (or high efficiency coding technology) has been used to reduce the data quantity of the original video signal for a long time video recording. An example of the bit rate reduction technology is intra-frame processing. In the intra-frame processing, a two field unit of the video signal is compressed, that is, every frame of the video signal. The video signal in a television signal form is an interlaced signal, two fields of which constitutes one frame. By the intra-frame processing, the video signal is compressed to a non-interlaced form. The non-interlaced signal has the line-to-line distance (between scan lines) reduced to one-half of that for the interlaced signal. Therefore, when a still picture is displayed, the correlation between lines is high and the compression is done efficiently. Even when the displayed image is a moving picture, compression can be done with high efficiency by performing motion compensation between two fields. The high efficiency in the compression mentioned above is not unique to the intra-frame processing, but in general, the compression efficiency will be higher when the processing unit of video signals to be processed become larger so long as there is no scene change in the video signal.

However, in conventional video signal recording/reproducing apparatuses, if compression in multiple field units is applied, expansion in multiple field units is necessary in reproduction. Therefore, there is a problem, as described below, in trick plays, such as slow play and high-speed search.

With reference to processing in two field units (hereinafter referred to as intra-frame processing), this problem will be described. Let us first consider a field array which is reproduced and outputted for slow play. When the video signal recording/reproducing apparatus is performing compression and expansion in two field units, the video signal can be reproduced only in two field units at all times. Consequently, in slow play, the same frame is output repeatedly for a specified number of times corresponding to the reproducing speed at that time. With regard to the order of arrangement of fields for a period in which the same frame is output repeatedly, if the field that occurs ahead in time of the two fields constituting one frame is named as the former field and the field that occurs behind in time is denominated as the latter field, the former and latter fields are displayed alternately on the screen in the following order: former field—latter field—former field—latter field, and so on. For an array of a former field—latter field, two fields having between them a forward time difference which corresponds to one field and which is the same as when visual images were recorded, are displayed with a time difference placed in the forward direction. For an array of a latter field—former field, two fields having between them a reverse time difference corresponding to one field are displayed with a time difference placed in the forward direction. In a picture reproduced in the forward direction, a time difference in the reverse direction causes a flicker and severely deteriorates the picture quality of the moving picture.

A case of high-speed search will next be described. As for the field array of an output video signal, because the operation is a high-speed search, intermittent frames are arranged with a certain number of frames of video signal thinned out according to the reproducing speed. In a high-speed search in the forward direction, the order of arrangement of the fields is not reversed as in a slow play in the forward direction mentioned above. However, though the time difference between two fields constituting one frame as one processing unit corresponds to a period of one field when these fields are recorded the succeeding fields which are reproduced just after on the screen are those which constitute a processing unit after passage of a specified number of frames decided according to the reproducing speed. Therefore, in a high-speed search, there are mixed field arrays having only a time difference corresponding to one field and field arrays having a greater time difference due to the thinning out of frames for high speed search. As has been described, the presence of the arrays having irregular time differences in reproduced pictures is doubtless a big cause of picture quality deterioration in a moving picture.

From the foregoing description, it will be understood that in conventional video signal recording/reproducing apparatuses, in trick plays, if the time difference between fields within one processing unit differs from the time difference between processing units, and particularly in a slow play at normal speed or less, there are intermingled dissimilar time differences in the forward and reverse directions, thus substantially deteriorating the smoothness of the motion of the displayed pictures.

SUMMARY OF THE INVENTION

The object of this invention is to provide a video signal recording/reproducing apparatus free from impairment of smoothness of the motion in trick plays, which is caused by compression and expansion of the video signal in multiple field units in conventional video signal recording/reproducing apparatuses.

In order to achieve the above object, a video signal recording/reproducing apparatus comprises compression means for compressing the video signal in multiple field units, recording/reproducing means for recording the compressed video signal in a recording medium and reproducing the recorded signal, expansion means for expanding the reproduced signal in multiple field units mentioned above, reproducing mode setting means for setting a desired reproducing speed, recording medium transportation control means for controlling the transportation speed of the recording medium to suit said desired reproducing speed, synchronization detecting means for obtaining a field signal by detecting a synchronization pattern from said reproduced signal, field detecting means for obtaining a reciprocal of a reproducing speed multiplication factor with respect to normal speed from said reproducing speed and making a field period expressed by said reciprocal a continuous field reproduction period according to said reciprocal and said field signal from said synchronization detecting means, and change-over means for repeatedly outputting on the screen each field of the video signal in multiple field units given by said expansion means for said continuous field period.

Another video signal recording/reproducing apparatus according to this invention comprises compression means for compressing the video signal in multiple field units, recording/reproducing means for recording the compressed video signal in a recording medium and reproducing the recorded signal, expansion means for expanding the reproduced signal in multiple field units mentioned above, reproducing mode setting means for setting a desired reproducing speed, recording medium transportation control means for controlling the transportation speed of the recording means to suit said reproducing speed, synchronization detecting means for obtaining a field signal by detecting a synchronization pattern from said reproduced signal, and change-over means capable of sequentially outputting the video signal in said multiple field units according to a field signal from said synchronization detecting means in normal reproduction, and also continuously and repeatedly outputting one field of signal out of one unit of the multiple field units until signal of the next unit of the multiple field units can be obtained.

According to the above-mentioned arrangements of this invention, even if the video signal is compressed and expanded in multiple field units, the video signal having a fixed time difference with regard to the motion of the images in a trick play can be displayed on the screen, so that a good picture quality can be obtained with no inadequacy of the motion of the reproduced pictures.

DESCRIPTION OF THE PREFERRED EMBODIMENTS

Figure 1:
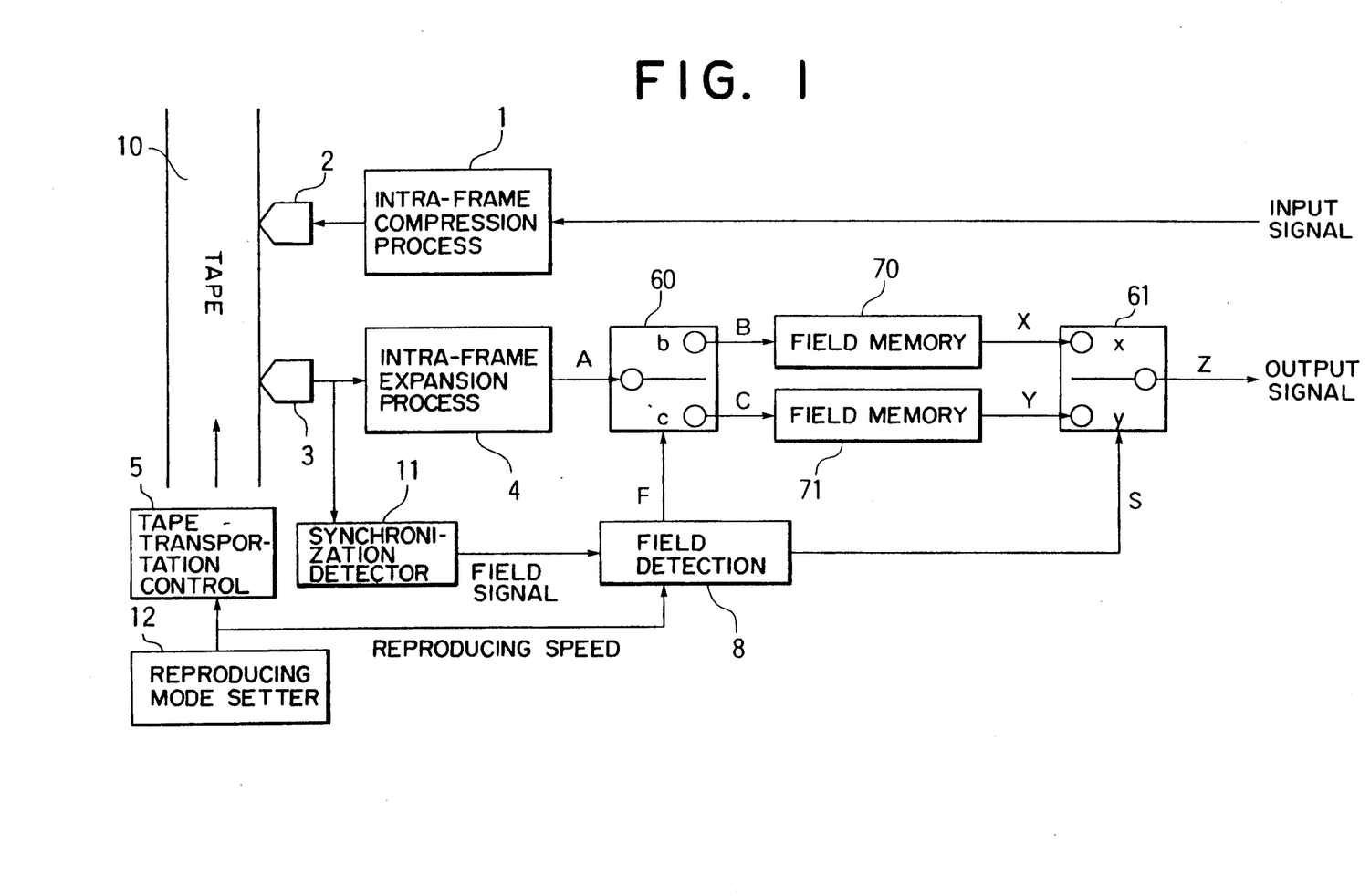
FIG. 1 is a block diagram of a video signal recording/reproducing apparatus according to a first embodiment of this invention and shows the apparatus processing the video signal in two field units.

FIG. 1 is a block diagram of the video signal recording/reproducing apparatus according to the first embodiment of this invention and the apparatus is a digital video tape recorder (VTR) which uses a magnetic tape as a recording medium, records and reproduces the video signal through the compression and expansion processes in which two fields, namely, one frame, of the video signal is handled as a processing unit. Here, a process treating one frame as a processing unit is referred to as intra-frame processing.

In FIG. 1, reference numeral 1 indicates an intra-frame compression process circuit for an intra-frame compression of the input video signal, and 2 indicates a recording head which lays down the output signal of the intra-frame compression circuit on a magnetic tape 10 in a magnetization pattern. A video signal recording section is formed by the intra-frame compression process circuit 1 and the recording head 2. Reference numeral 3 indicates a preproducing head for reproducing the signal from the magnetic tape 10, 4 indicates an intra-frame expansion process circuit for an intra-frame expansion process of the output signal from the reproducing head 3, and by these two components, a video signal reproducing section is formed which reconstitutes the original video signal from the signal recorded in the magnetic tape by the video signal recording section Needless to say, the recording head 2 and the reproducing head 3 are rotating heads mounted on a rotating cylinder (not shown) on which the magnetic head is wrapped with a specified angle. The same head may be used as the recording head 2 and the reproducing head 3. A tape transportation control circuit 5 has a tape transfer function (not shown) including a capstan motor, a capstan, etc. and controls a tape transportation speed according to a desired reproducing speed in reproduction. Said desired reproducing speed can be set arbitrarily by the user of this video signal recording/reproducing apparatus by the use of a reproducing speed setter 12.

A synchronization detector 11 detects a synchronization pattern on the magnetic tape 10 from the signal obtained by the reproducing head 3, controls a rotating speed of the rotating cylinder (not shown) so that the reproducing head 3 optimally traces tracks or sinks where the magnetization pattern is recorded (this operation is called tracking), and also detects and outputs a start timing of frames, each being a processing unit in the intra-frame expansion process circuit 4 and a start timing of fields to display the output of the intra-frame expansion process circuit 4 in field units on the screen. Reference numeral 60 indicates a first change-over circuit for dividing the output signal of the intra-frame expansion process circuit to send individual fields alternately to two separate systems according to field signals detected by the synchronization detector circuit 11. Reference numeral 70 indicates a first field memory for storing the output signal from one side of the change-over circuit 60, and 71 indicates a second field memory for storing the output signal from the other side of the change-over circuit 60' indicates a second change-over circuit for outputting output signals of the field memories 70, 71 by selectively changing over their passages. In order to cause a reciprocal of a reproducing speed multiplication factor set by the reproducing mode setter 12 to be selected as a number of continuous reproduction of one field, the field selecting circuit 8 outputs a field signal F for controlling the first change-over circuit 60 and a control signal S for controlling the second change-over circuit 61.

Figure 9:
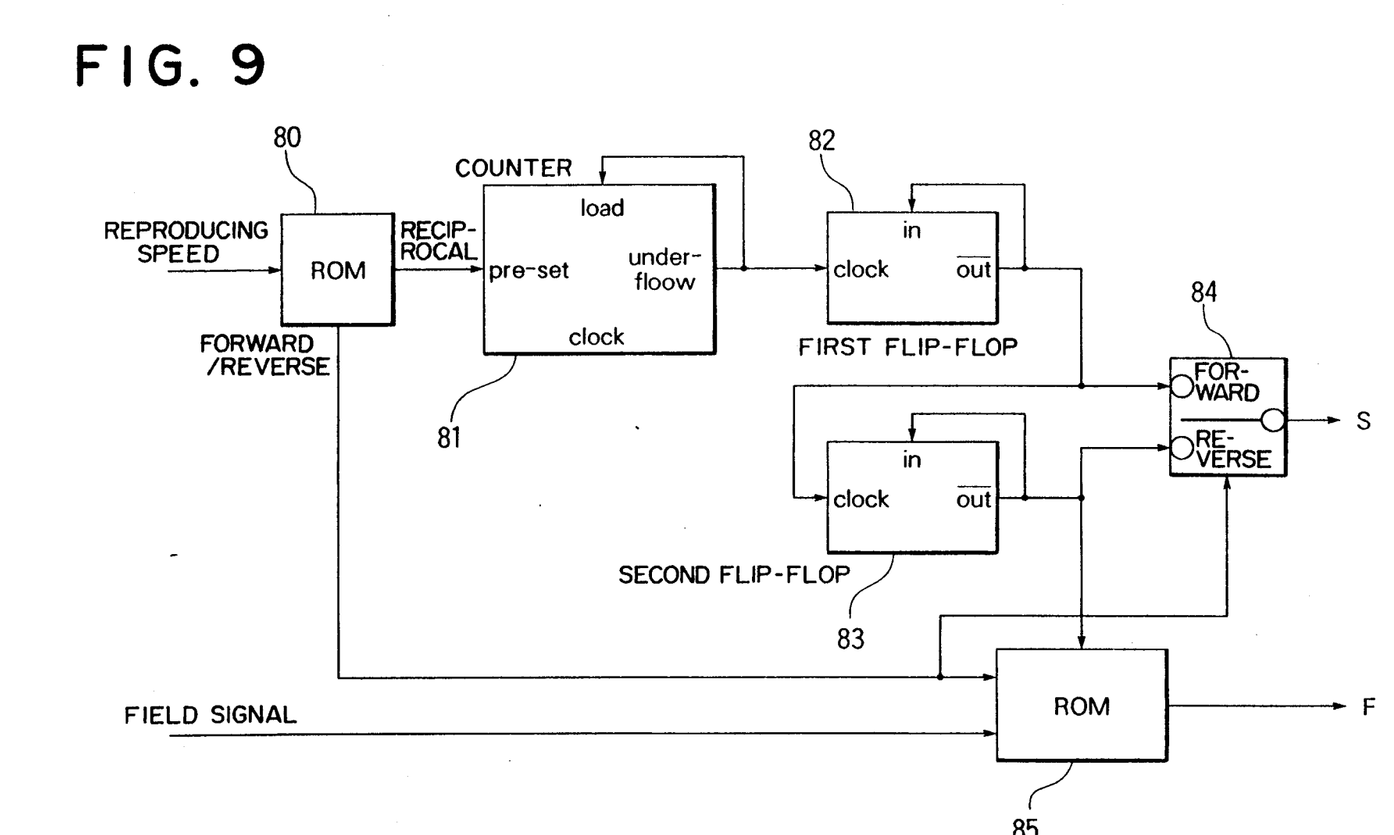
FIG. 9 is a block diagram showing the internal construction of a field detecting circuit 8, which is a component of the video signal recording/reproducing apparatus according to the first embodiment.

FIG. 9 is a block diagram of an example of the internal construction of the field detecting circuit 8. A reciprocal setter 80 outputs a forward/reverse signal for specifying the forward or reverse direction according to codes representing a reciprocal of an absolute value of a reproducing speed and the reproducing speed supplied by the reproducing mode setter 12. This reciprocal setter can be realized by use of a Read-Only-Memory (ROM). By setting one of the output signals of the reciprocal setter 80 as a preset value, a counter 81 performs a countdown by using a field signal from the synchronization detector 11 as a counter clock signal, sends an underflow pulse as an output signal, and receives the underflow pulse as a load signal to the counter itself. (The preset value is used as an initial value of the countdown.) A first flip-flop 82 receives an underflow pulse provided by the counter 81 as an input clock signal and gets the inverted output as input data for the first flip-flop itself. A second flip-flop 83 receives the inverted output of the first flip-flop 82 as a clock signal and gets the inverted output of the second flip-flop as input data for the second flip-flop itself. A switch 84 operates according to a forward/reverse signal from the reciprocal setter 80. When a forward/reverse signal denotes the forward direction, in compliance with the inverted output of the first flip-flop, the switch 84 sets a control signal S which is provided by the field detecting circuit 8, and when a forward/reverse signal denotes the reverse direction, in compliance with the inverted output from the second flip-flop, the switch 84 sets a control signal S which is provided by the field detecting circuit 8. A field signal setter 85 operates according to a forward/reverse signal from the reciprocal setter 80. When a forward/reverse signal denotes the forward direction, the field signal setter 85 keeps a field signal from the synchronization detecting circuit 11 at its current state and outputs a field signal F. When a forward-/reverse signal denotes the reverse direction, the field signal setter 85 operates according to two kinds of states of output signals of the flip-flop 83. When the output signal is in one of the two states, the field signal setter 85 keeps the current state of the field signal from the synchronization detector 11, and outputs a field signal F, and when the output signal is in the other of the two states, the field signal setter 85 inverts a field signal from the synchronization detector 11 and outputs an inverted field signal F. This field signal setter can be realized easily by a ROM, but can alternatively be realized very easily by using a logic circuit or a switch.

Figure 2:
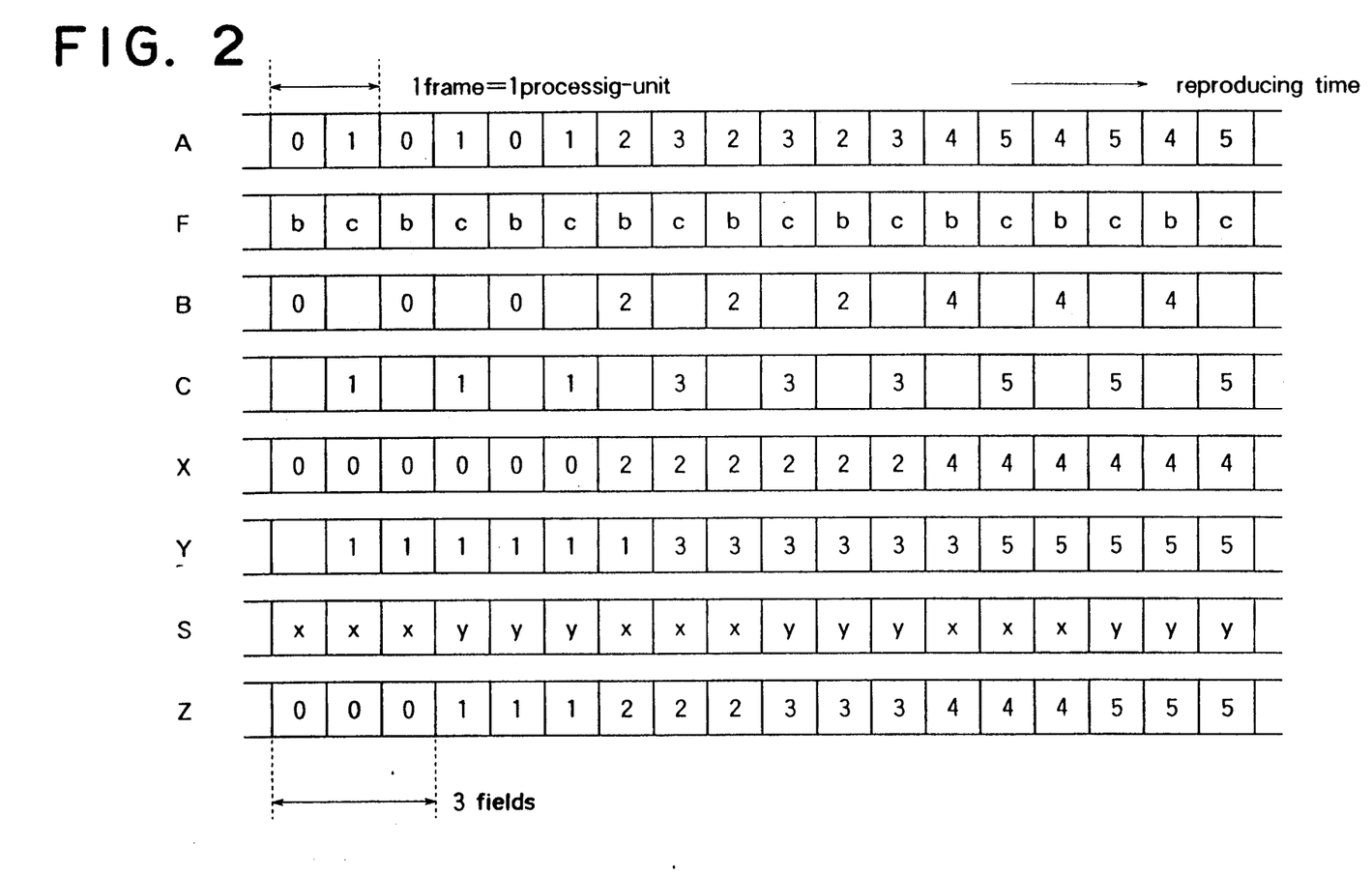
FIGS. 2, 3 are timing charts showing field arrays of signal in the constituent elements for explaining the video signal recording/reproducing apparatus according to the first embodiment.

The operation of the above-mentioned arrangement of the present embodiment will be described with reference to a timing chart showing field arrays of signals at various components of the present embodiment in FIG. 2. FIG. 2 presents an example showing an operation at ⅓ normal speed among trick play functions of the VTR. In FIG. 2, signal A denotes the output of the intra-frame expansion process circuit, 1 in FIG. 1, which proceeds from left to right on the time base. The numbers in the signal A show field numbers of video signals recorded in the magnetic tape, and one box corresponds to a period of one field. In this embodiment in which intra-frame processing is performed, in the signal A, signals for one frame are always included in one frame period. Since the operation is performed at ⅓ normal speed, data for one frame is output repeatedly and continuously for a period of three frames.

Conventionally, this signal A is outputted on the screen, so that a sequential field array is reversed at some points in every three-frame period. For example, in FIG. 2, this occurs where signals of a field 1 are followed by signals of a field 0.

In this embodiment, by field signals of F from the field detecting circuit 8, the first change-over circuit 60 divides the output signals of A of the intra-frame expansion process circuit 1 into even fields and odd fields, which are signals B and C. In FIG. 2, the field signals of F are denoted by b where the fields are even fields, and by c where the fields are odd fields. In other words, the first change-over circuit 60 outputs an even field signal B when the field signal F is b and an odd field signal C when the field signal F is c. Description will now be made of the first change-over circuit 60, and the field memories 70, 71. The field memories 70, 71 have the same addresses for writing and reading data, and the write/read addresses for one field have only to be repeated. As for write and read timing, in one address period, data provided by the first change-over circuit 60 is written and read, that is to say, the so-called read-after-write operation is performed. The first change-over circuit 60 operates as if it gives write enable/write inhibit control signals to the field memories 70, 71. More specifically, when a field signal F is b, the field memory 70 is write enabled, while the field memory 71 is write inhibited. Conversely, when a field signal F is c, the field memory 70 is write inhibited, while the field memory 71 is write enabled. Therefore, the field memory 70 receives signal B which is judged to be even fields by the first change-over circuit 60. During an even field period, a signal B is written in the memory and at the same time, the signal B is output. On the contrary, during an odd field period, the field memory 70 is write inhibited, so that the signal B stored in the field memory 70 is outputted again. This signal outputted from the field memory 70 is referred to as a signal X. Signals X are always even field signals as shown in FIG. 2.

On the other hand, the field memory 71 receives signal C judged to be odd fields by the first change-over circuit 60, and during an odd field period, writes a signal C in the memory and outputs the signal C at the same time, but during an even field period, the field memory 71 is write inhibited, and therefore, again outputs the signal C which has been stored therein. Accordingly, if the output of the field memory 71 is denoted as signal Y, field signals of signal Y are always odd field signals.

The second change-over circuit 61 selects either one of a signal X and a signal Y and outputs a signal Z to be displayed on the screen, and for this selection, uses a control signal S provided by the field detecting circuit 8. FIG. 2 shows that a control signal S is x for selection of a signal X and y for selection of a signal Y. Control signal S is provided by the field detecting circuit 8. The field detecting circuit 8 causes a reciprocal of a multiplication index of reproducing speed to be selected as a number of continuous reproduction of the same field by the second change-over circuit. Since the reproducing speed is ⅓ of normal speed, a reciprocal 3 is found, and signals of each field are reproduced at intervals of three fields.

FIG. 2 shows the signals of signal Z consisting of a field arrays of signal to be reproduced on the screen. Unlike the signal A, in the signal F, there are no field arrays, which are outputted in a backward sequence in time with respect to the input signals in recording, so that a remarkable advantage of this technique is that the displayed pictures are free of flicker in slow play mode.

The reproducing operation at −⅓ of normal reproducing speed in this embodiment will be described with reference to a timing chart showing the field arrays of signals at various components. The signals of the output signal A of the intra-frame expansion process circuit 4 when the reproducing speed is −⅓ of normal speed are the same as in the above-mentioned reproduction at ⅓ of normal speed with respect to the way in which fields are arrayed in a frame as one processing unit and the continuous reproduction of one processing unit at an interval of three frames The difference is that since this operation is reproduction in the reverse direction, the order in which the frames are taken by the tape-head system is a descending order of field numbers as shown in the signal A. In the prior art, even though this operation is reproduction in the reverse direction, there are field arrays in one of which there is a time difference of three fields, including one field in the forward direction and one field in the reverse direction (e.g. from field 5 to field 4, from field 5 to field 2).

In this embodiment, in a reverse reproduction, the operation of the signals F and S provided by the field detecting circuit 8 differs from that in FIG. 2. First with regard to the, signal F, as has been described with respect to the internal construction of the field detecting circuit 8 the sequence of b and c is reversed when necessary according to the reproducing speed instead of alternately selecting b and c in compliance with the occurrence of even fields and odd fields. In the reproduction at −⅓ of normal speed, the sequence of b and c, which represent even and odd fields, is reversed at every three frames. This number three is a reciprocal of ⅓ of normal speed (the signal F in FIG. 3). With regard to the signal S, as with the signal F, the selection of output of the field memory 70 and the field memory 71 (signal X and signal Y) is reversed every three frames. A field signal selected by the second change-over circuit 61 according to a signal S is a signal Z corresponding to an odd field in two fields of one processing unit. Since this operation is reproduction in the reverse direction, if signals are processed in multiple field units, the number of fields of which is greater than in intra-frame processing, it is nothing other than outputting field signals starting with a field signal of the largest field number (i.e. the last field signal of all field signals recorded in video recording).

Figure 3:
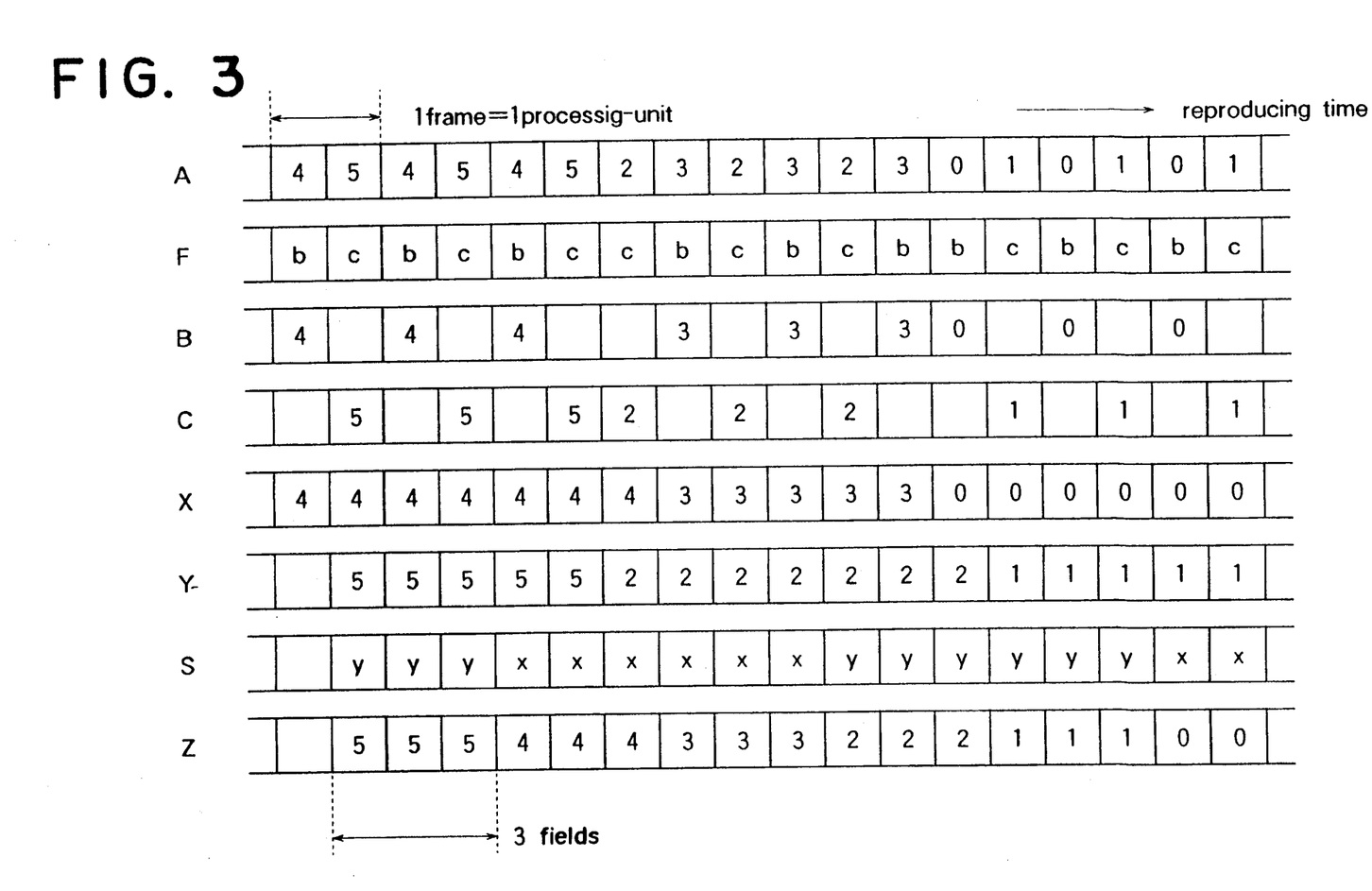

According to the signals F and S provided by the field detecting circuit 8 described above, the field arrays in the signals B, C, X, and Y are as shown in FIG. 3, so that the field arrays of signal Z, which are outputted on the screen, have a constant inter-field time difference of one field (except for field arrays without time difference) even in the slow play in reverse direction, with the result that a fine picture quality is obtained in slow play.

Figure 4:
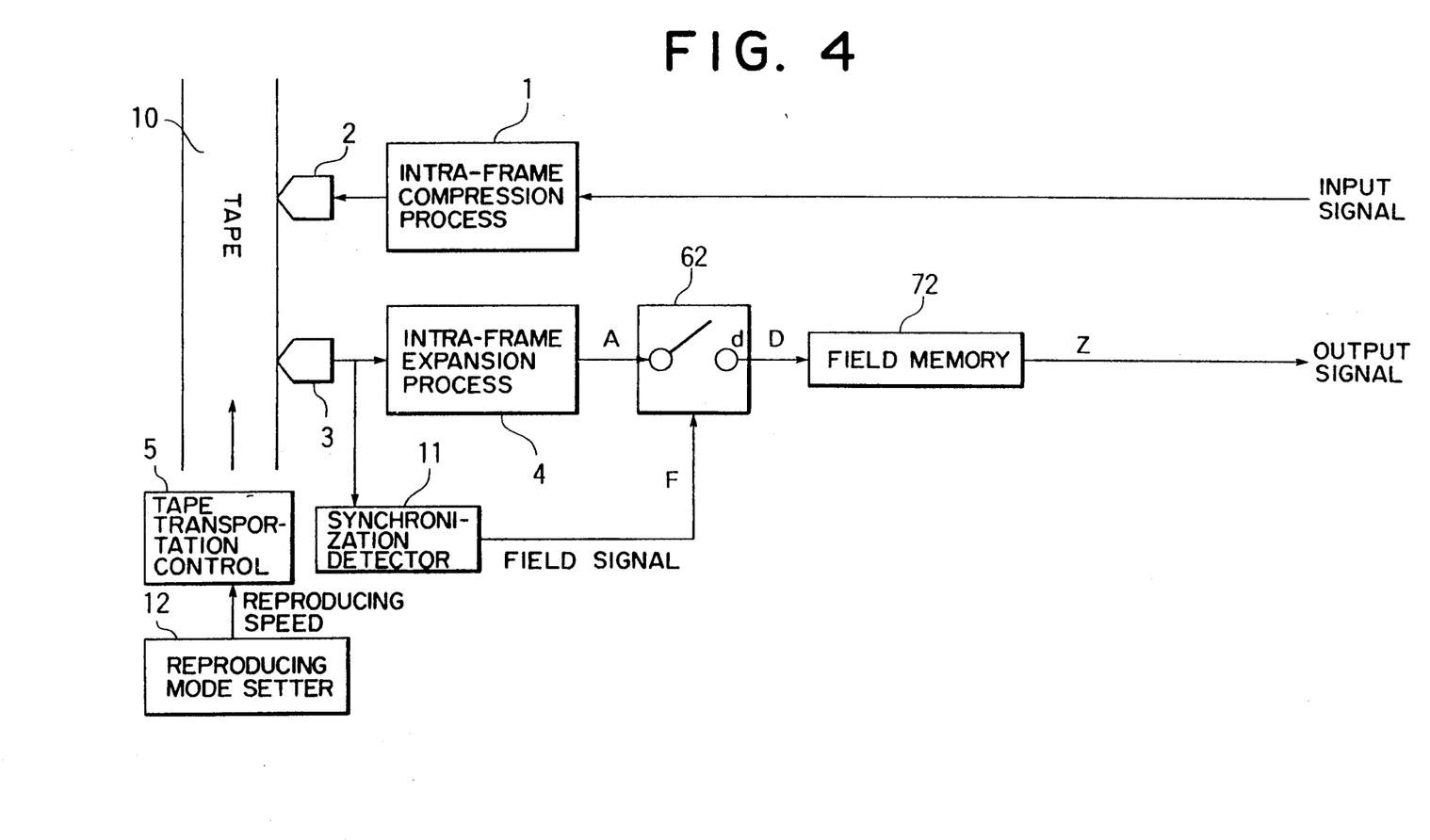
FIG. 4 is a block diagram of a video signal recording/reproducing apparatus according to a second embodiment of this invention and shows the apparatus performing intra-frame processing.

FIG. 4 is a block diagram of the video signal recording/reproducing apparatus according to a second embodiment of this invention, and this apparatus is a digital VTR which uses a magnetic tape as a recording medium as in the first embodiment described above and performs video recording and reproduction by compression and expansion processes in intra-frame processing. In FIG. 4, an intra-frame compression process circuit 1, a recording head 2, an reproducing head 3, a intra-frame expansion process circuit 4, and a tape transportation control circuit 5 have the same functions and operate in the same way as in the first embodiment, with the only difference being in a change-over circuit 62 and a field memory 72. The second embodiment of this invention will be described in the following.

Figure 5:
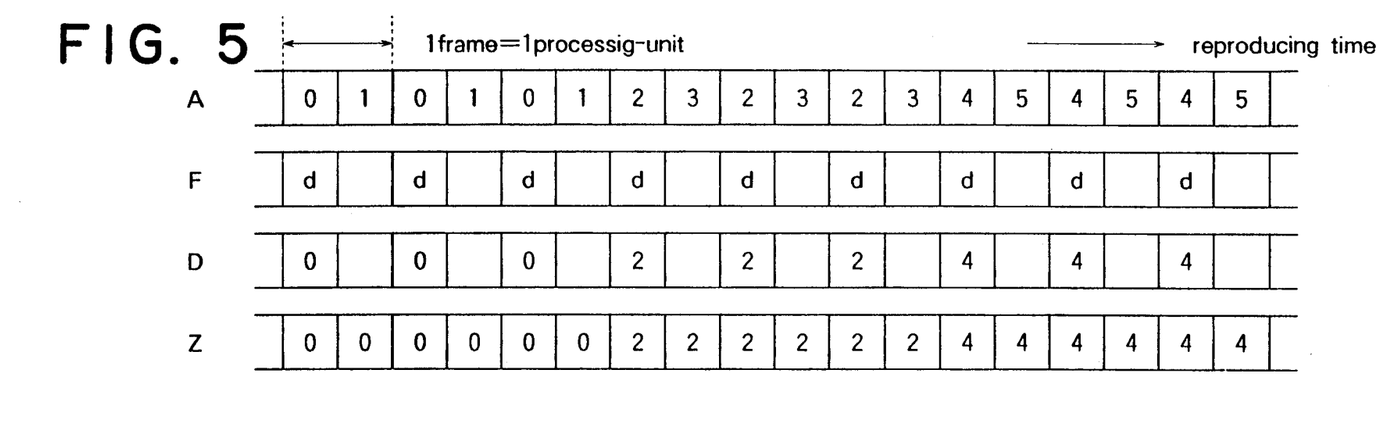
FIGS. 5, 6, 7, 8 are timing charts showing field arrays of signal in the constituent elements for explaining the video signal recording/reproducing apparatus according to the second embodiment.

FIG. 5 is a timing chart showing the field arrays of signals at various components of a reproducing system operated at ⅓ of normal speed as in the first embodiment when the video signal recording/reproducing apparatus according to the second embodiment is used. Signal A shows output signals of the intra-frame expansion process circuit 4, which signals are composed of repetitions of three consecutive frames of the same kind, each frame being one processing unit. The change-over circuit 62 is controlled by a field signal F, and transfers signals of signal A mentioned above as signal D to the field memory 72 at the subsequent stage only when a field signal F is an even field. Signals D output by the change-over circuit 62 are shown in FIG. 5. Only when a field signal F is an even field does the change-over circuit 62 output a signal D, so that even field signals of signal F are shown in FIG. 5.

The field memory 72 performs a read-after-write function as in the field memories 70, 71 in the first embodiment described above, and has the change-over circuit 62 operate to issue write enable/write inhibit control signals to the field memory 72. In a period when the field memory F is d and the change-over circuit 62 outputs a signal D, the field memory 72 is write enabled. In a period when a signal D is not output, the field memory is write inhibited. Therefore, when a signal D is applied to the field memory 72, the field memory 72 has the signal D written therein and outputs the signal D at the same time. When a field signal F is an odd signal and a signal D is not output, the field memory 72 again outputs a signal D which has been stored. Outputs of the field memory 72 are shown as signal D in FIG. 4. In contrast to the first embodiment, the signal Z is composed of signals representing even fields, so that there are no fields which are outputted in a backward sequence in time as in the prior art.

Figure 6:
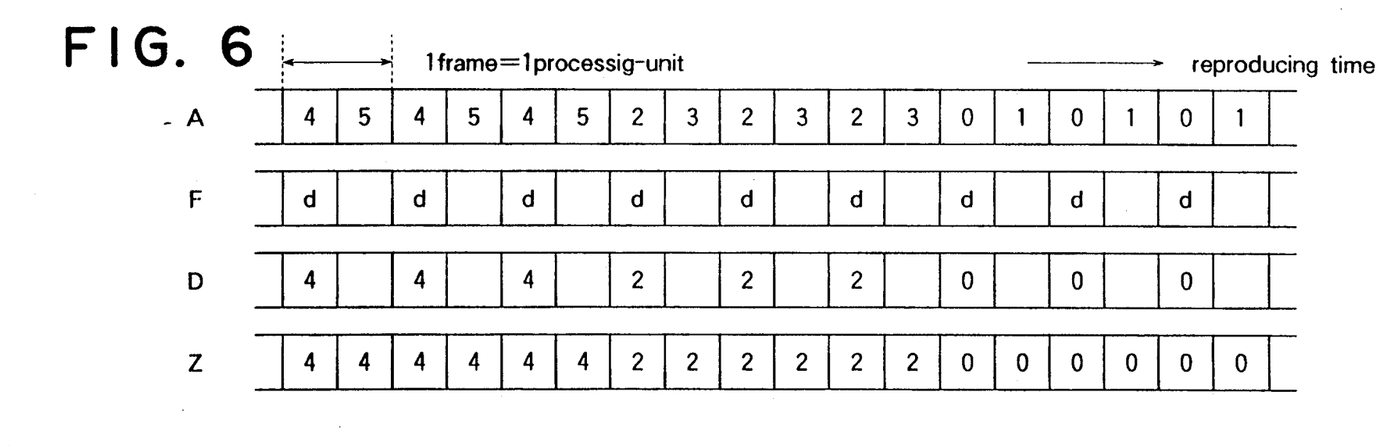

Description will now be made of a slow play in the reverse direction. FIG. 6 is a timing chart showing field arrays of signals at various components for explaining the operation in reproduction at −⅓ of normal speed. In the second embodiment only even fields are outputted on the screen as described, and there are no forward field arrays in reverse reproduction between an two fields constituting a frame as one processing unit, so that there is no possibility of reverse field arrays being disturbed in the signal Z shown in FIG. 6.

Figure 7:
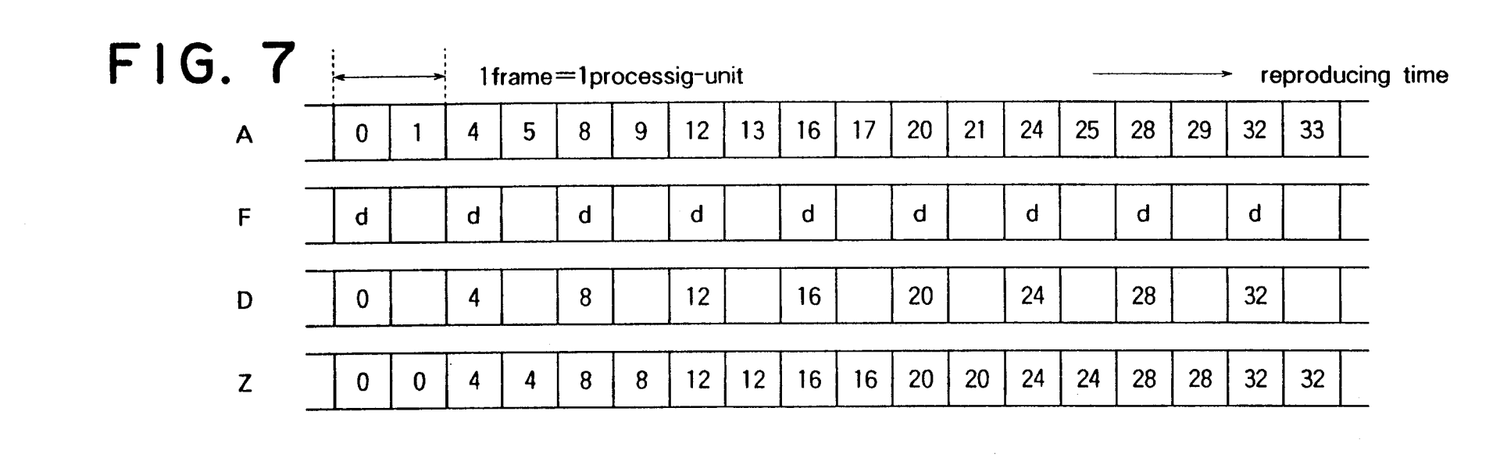

The operation of reproduction at a speed twice that of normal speed in this second embodiment will be described with reference to the timing chart of FIG. 7 showing field arrays of signals in the various components. For the output signal A of the intra-frame expansion process circuit 4 in reproduction at twice the normal speed, unlike in reproduction at ⅓ of normal speed, data of all frames (data of all fields) cannot be obtained from the tape-head system but only data of every other frame can be obtained. Therefore, the numbers of signal A are arrayed as shown in FIG. 7.

In a system in which intra-frame processing is performed as in a this embodiment, even in high-speed search faster than normal speed, an expansion process is carried out in frame units, so that the fields are arrayed in frame units for the signal A. Accordingly, if signal A is reproduced on the screen as in the prior art, there will undoubtedly to be field arrays which have dissimilar time differences between fields. Referring to FIG. 7, signals are reproduced in frame units starting with the leftmost frame, and a time difference corresponding to one field is placed between field 0 and field 1 in reproduction. However, between field 1 and field 4, there is a time difference corresponding to three fields. Stated differently, in the reproduced pictures on the screen, a time difference of one field and a time difference of three fields occur alternately. This phenomenon does not become a problem when only video signals of still pictures are recorded. However in video recording/reproducing apparatuses for recording video signals of moving pictures, such as a VTR, the irregularity of time difference between fields will result in producing pictures giving the viewer an uncomfortable sensation.

In this second embodiment, by the use of the change-over circuit 62 operated by a signal F to receive the signal A mentioned above, the signal D gathered by taking even fields only and the signal Z outputted from the field memory 72 are arrayed as shown in FIG. 7. By looking at the signal Z of FIG. 7, it is understood that there are two kinds of time difference, that is, there are some fields which have no time difference and other fields which have a time difference corresponding to four fields. The field arrays with no time difference are of complete still pictures. Therefore, those field arrays are equivalent to the field arrays with only a time difference of four fields, and they do not produce reproduced pictures which give the viewer an uncomfortable feeling.

Figure 8:
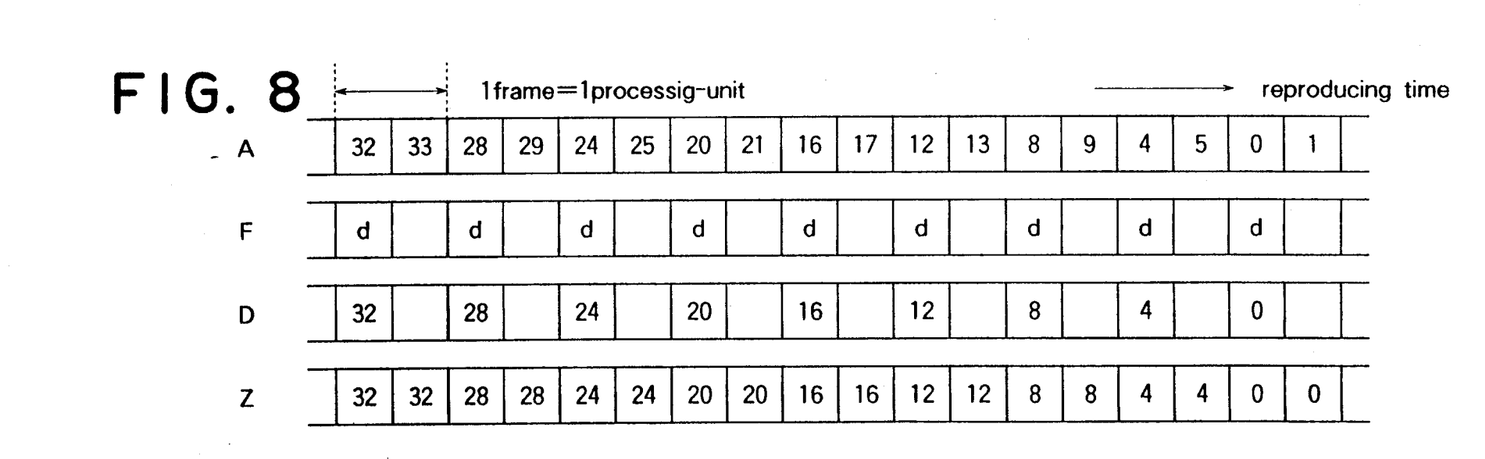

FIG. 8 is a timing chart showing the field arrays of signals in the various components in reproduction at speed −2 times as fast as normal speed, which indicates the operation of this embodiment in high-speed search in the reverse direction. In this case, too, since only even fields are reproduced in this embodiment, there is no possibility that the reverse field arrays are disturbed in the signal Z, so that this embodiment contributes to improving the picture quality in high-speed search.

As described above, by the arrangement of this embodiment, only the time difference between processing units is shown in a reproduced pictures even in high-speed search. The video signal is formed with a fixed time difference for moving pictures,.so that the video signal can be reproduced to form moving pictures with fine picture quality.

If a reciprocal of a reproducing speed multiplication factor is not an integral number, the reciprocal setter 80 in the internal composition of the field detecting circuit 8 of FIG. 9 may be arranged to output an integral number closest to a reciprocal which is not an integral number. Then, a number of continuous reproductions of a field signal can be easily made an integral number. In a high-speed search at a higher than normal speed, a reciprocal of a multiplication index of reproducing speed is less than 1. In this case, as described with reference to the second embodiment, all of the field data recorded in the tape cannot be retrieved. Therefore, by arranging the reciprocal setter 80 to always output 1 as a reciprocal of any output signal when the reproducing speed is higher than normal speed, a number of times of reproduction of each field is made one, resulting in the same conventional reproduction operation in frame units. As a result, it is only necessary to use a method of the second embodiment which outputs only one field from each processing unit in high-speed search. In a case where one processing unit is a plurality of frames, the first embodiment can be applied to reproduce one of the fields of each frame within one processing unit.

In the arrangements of the first and second embodiment (FIGS. 1, 4), the field memories (70, 71, 72) are provided separately from the intra-frame expansion process circuit 4. However, the intra-frame expansion process circuit 4 processes two fields at the same time, and when the process result is outputted on the screen, signals are outputted in frame units. Therefore, at least one or more field memories are provided. Even if input signals into the field memories 70, 71, 72 are not divided into fields, it is only necessary for data stored in each field memory to be separated into fields. The field memories 70, 71, 72 are compatible with the field memory in the intra-frame expansion process circuit 4. The operation of the intra-frame expansion process circuit 4 described with reference to the embodiments of this invention is performed in frame units. However, two fields constituting one frame of the output signal A have been separated before they are output. The separated state of fields is achieved by separating data extending over two fields into ordinary field arrays through write and read operations of the field memory with a memory capacity of one or more fields in the intra-frame expansion process circuit 4. Therefore, by matching the operation of the field memories 70, 71, 72 and the change-over circuits 60, 62 according to this invention with the write and read operations in the intra-frame expansion process circuit 4, data to be stored in the field memories 70, 71, 72 can be easily separated into fields. In the field memories according to this invention, input signals need not necessarily be separated into fields, but it is only necessary to have the signals separated into fields when they are outputted and eventually displayed on the screen in such a way that a number of fields continue which corresponds to a reciprocal of the multiplication index of the reproducing speed and a number of fields as one processing unit. The second embodiment is much easier. Whatever number of fields constitutes one processing unit, in trick plays by continuously outputting only one field out of one processing unit on the screen, the fields can be arrayed in a predetermined form for reproduction both in the forward and reverse directions.

What is claimed is:

1. A video signal recording/reproducing apparatus comprising:
   compression process means for compressing the video signal in multiple field units;
   recording/reproducing means for recording the compressed signal on a recording medium and reproducing the recorded signal;
   expansion means for expanding said reproduced signal in multiple field units;
   reproducing mode setting means for setting a desired reproducing speed;
   recording medium transportation control means for controlling a transportation speed of said recording medium according to said reproducing speed;
   synchronization detecting means for obtaining a field signal by detecting a synchronization pattern from said reproduced signal;
   field detecting means for finding a reciprocal of a reproducing speed multiplication factor with respect to normal speed and for detecting a plurality of fields designated by said reciprocal as a continuous field having a period equal to a sum of periods of said plurality of fields according to said reciprocal and a field signal obtained by said synchronization detecting means; and
   change-over means for continuously and repeatedly outputting individual fields of the video signal in multiple field units obtained by said expansion means for the period of said continuous field obtained by said field detecting means.

2. A video signal recording/reproducing apparatus comprising:

compression process means for compressing the video signal in multiple field units;

recording/reproducing means for recording the compressed signal on a recording medium and reproducing the recorded signal;

expansion means for expanding the reproduced signal in said multiple field units;

reproducing mode setting means for setting a desired reproducing speed;

recording medium transportation control means for controlling a transportation speed of said recording medium according to said reproducing speed;

synchronization detecting means for obtaining a field signal by detecting a synchronization pattern from said reproduced signal; and change-over means for sequentially outputting expanded video signals in said multiple field units obtained by said expansion means according to a field signal from said synchronization detecting means in normal reproduction and for continuously and repeatedly outputting one field of signals out of one unit of said multiple field units for a period of said multiple field units.

* * * * *